United States Patent

Komiya et al.

[11] Patent Number: 5,088,084
[45] Date of Patent: Feb. 11, 1992

[54] FLOPPY DISK AUXILIARY MEMORY DEVICE

[75] Inventors: Hidetsugu Komiya; Mitsuo Kurakake, both of Hino; Seiichi Hattori, Hachioji, all of Japan

[73] Assignee: Fanuc Ltd., Yamanashi, Japan

[21] Appl. No.: 553,344

[22] PCT Filed: Oct. 24, 1985

[86] PCT No.: PCT/JP85/00592

§ 371 Date: May 21, 1986

§ 102(e) Date: May 21, 1986

[87] PCT Pub. No.: WO86/02769

PCT Pub. Date: May 9, 1986

Related U.S. Application Data

[63] Continuation of Ser. No. 256,064, Oct. 11, 1988, abandoned, which is a continuation of Ser. No. 871,414, May 21, 1986, abandoned.

[30] Foreign Application Priority Data

Oct. 29, 1984 [JP] Japan ................. 59-226980

[51] Int. Cl.$^5$ .................. G11B 19/04; G11B 1/00; E05B 41/00
[52] U.S. Cl. .................. 369/75.1; 369/292; 340/505; 360/137
[58] Field of Search ................. 369/19, 20, 21, 22, 369/23, 24, 75.1, 34

[56] References Cited

U.S. PATENT DOCUMENTS

| 3,725,603 | 4/1973 | Mathews et al. | 369/20 X |
| 3,940,793 | 2/1976 | Bleiman | 369/77.2 |
| 4,451,912 | 5/1984 | Kirschner | 369/77.2 |
| 4,458,331 | 7/1984 | Amezcua | 364/900 |
| 4,467,466 | 8/1984 | Hughes | 369/77.2 |
| 4,502,083 | 2/1985 | Bauck et al. | 360/99 |
| 4,646,241 | 2/1987 | Ratchford et al. | 360/5 X |
| 4,682,292 | 7/1987 | Bue et al. | 360/5 X |

FOREIGN PATENT DOCUMENTS 58-175102 10/1983 Japan.
59-36369 2/1984 Japan.
59-89405 6/1984 Japan.

Primary Examiner—Stuart S. Levy
Assistant Examiner—Kenneth B. Wells
Attorney, Agent, or Firm—Staas & Halsey

[57] ABSTRACT

A portable floppy disk auxiliary memory device contains a floppy disk drive device (7) and includes a portable body (1) having an insertion slot (1e) defined in a front face thereof for insertion of a floppy disk (8). An openable and closable door (2) is mounted on the body (1) for covering the front face thereof. If the door (2) is opened while the floppy disk drive device (7) is being operated, an alarm is issued.

8 Claims, 3 Drawing Sheets

FLOPPY DISK AUXILIARY MEMORY DEVICE

This is a continuation of copending application(s) Ser. NO. 07/256,064 filed on Oct. 11, 1988 now abandoned which is a continuation of co-pending application Ser. No. 06/871,414 filed on May 21, 1986, now abandoned.

BACKGROUND OF THE INVENTION

1. Field of the Invention

The present invention relates to a memory device for use as an auxiliary memory device in a numerical control apparatus for controlling a machine tool or the like, and more particularly to a portable auxiliary memory device employing a large-capacity and inexpensive magnetic recording disk.

2. Description of the Related Art

Numerical control (NC) apparatuses are used for controlling machine tools, industrial robots, and the like according to machining programs recorded on paper tapes and read one block by one block by the NC apparatus. As the machining process becomes more complex, the amount of information in the machining program increases, and cannot sometimes be recorded on a paper tape of an ordinary length. Large-capacity and relatively inexpensive magnetic recording disks or floppy disks, which are used in personal computers or the like, have recently found use as auxiliary memory devices for storing entire machining program information for an NC apparatus. A drive device for floppy disks is connected to the NC apparatus and combined with a CRT display, a keyboard, or a paper tape reader for use as the auxiliary memory device for the machines control unit of an NC apparatus.

Recently floppy disk drive devices have been incorporated in NC apparatus is proper. However since the drive devices are not portable, but contained in the NC apparatus, they cannot be used as auxiliary memory devices for other NC apparatus.

SUMMARY OF THE INVENTION

The present invention has been made in an effort to solve the problem of the conventional auxiliary memory device. It is an object of the present invention to provide a portable floppy disk auxiliary memory device that can be used as an auxiliary memory device for an NC apparatus, which has means to reliably prevent dust from entering the drive device.

According to the present invention, the foregoing object is attained by providing a portable floppy disk auxiliary memory device comprising a body containing a floppy disk drive device and having a floppy disk insertion slot defined in a front face thereof, a door openably and closably attached to a front portion of the body for covering the front face of the body, detecting means disposed in the vicinity of the door for detecting the opening and closing of the door, a control unit disposed in the body for issuing an alarm signal in response to an open-door signal from the detecting means during operation of the floppy disk drive device, and alarm means operable in response to the alarm signal from the control unit.

The portable floppy disk auxiliary memory device of the invention is arranged as described above. Since the body in which the floppy disk drive device is contained is portable, it can be carried easily and connected to an NC apparatus in use at any location. After use, the portable floppy disk auxiliary memory device can be carried and connected to another NC apparatus. Therefore, the portable floppy disk auxiliary memory device can efficiently be used in practice.

Inasmuch as the door is attached to the front portion of the body and covers the insertion slot at all times except when a floppy disk is to be loaded or removed, dust is prevented from entering the portable floppy disk auxiliary memory device through the insertion slot while the floppy disk auxiliary memory device is being carried or used in a dusty place. As a result, a dust deposit will not prevent the read/write head from touching the magnetic recording surface of the floppy disk.

Furthermore, if the door is opened while the floppy disk drive device is in operation, an alarm is issued by the alarm means to alert the operator. Thus the floppy disk is prevented from being read in error, and the recorded data is prevented from being distorted.

DESCRIPTION OF THE PREFERRED EMBODIMENT

Figure 1:
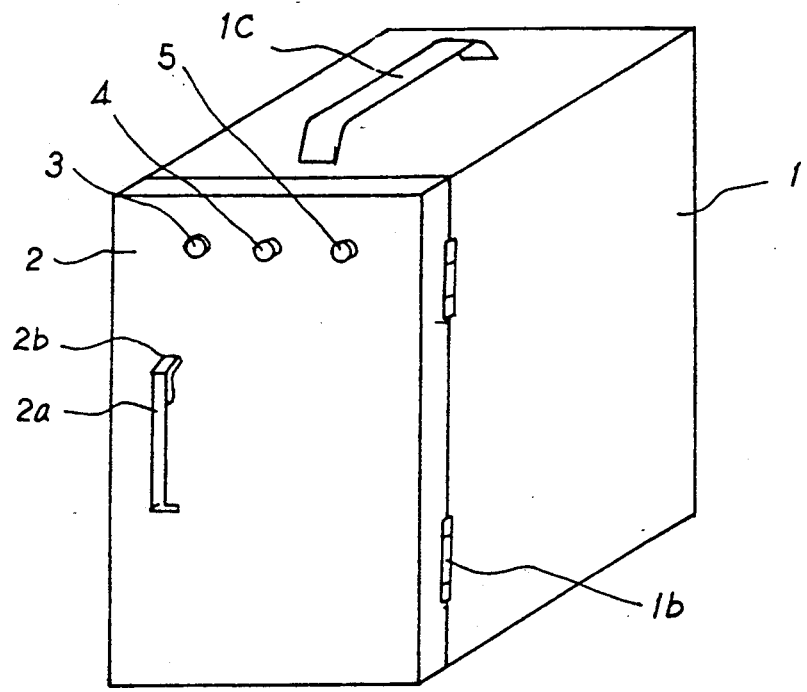
FIG. 1 is a perspective view of a portable floppy disk auxiliary memory device according to an embodiment of the present invention.

The present invention will hereinafter be described in specific detail with reference to an embodiment shown in the drawings.

Figure 2:
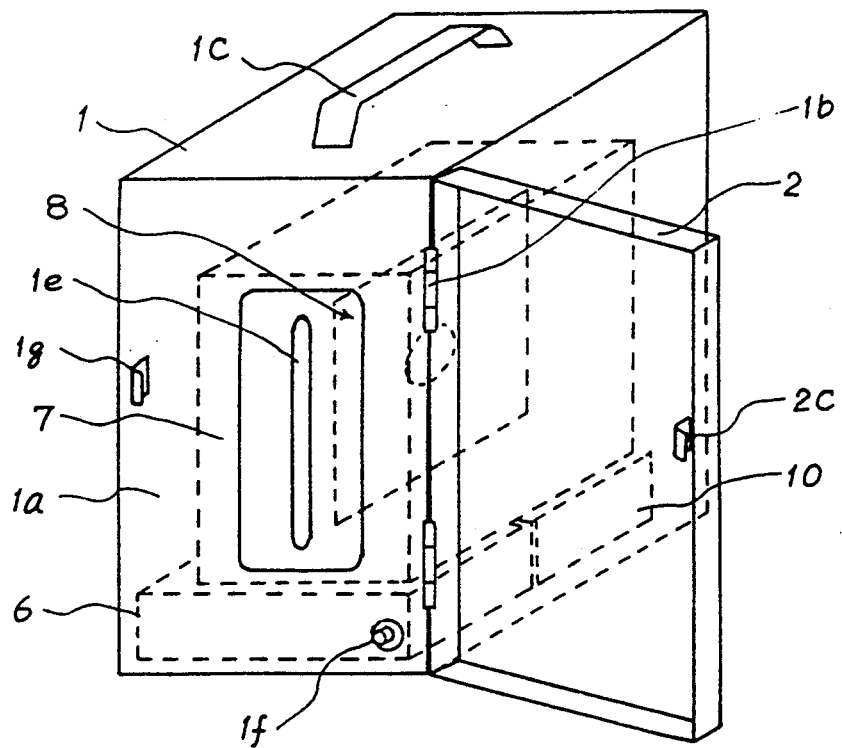
FIG. 2 is a perspective view of the portable floppy disk auxiliary memory device with its door open.
Figure 3:
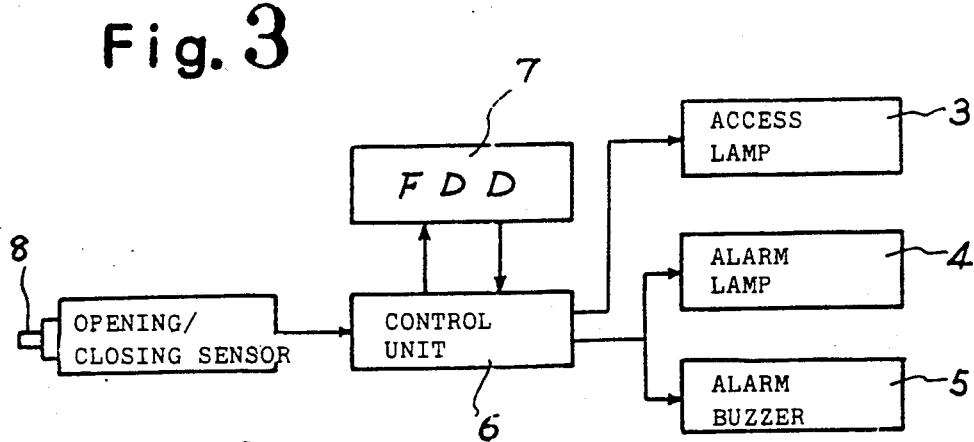
FIG. 3 is a block diagram of a control system for the memory device.

FIG. 1 is a perspective view of a portable floppy disk auxiliary memory device (portable FD auxiliary memory device) FIG. 2 is a perspective view of the portable FD auxiliary memory device with its door open, and FIG. 3 is a block diagram of a control system for the portable FD auxiliary memory device. As shown, the portable FD auxiliary memory device has a body 1, and a handle 1c that is mounted on an upper portion of the body by fixing means such as rivets or the like and is gripped when carrying the memory device. A panel 1a is attached to the front face of the body 1 and has an insertion slot 1e defined centrally therein for inserting a floppy disk (FD) 8 therethrough. Within, the body 1, there are housed a drive device (FDD) 7 for driving the FD 8 and a control unit 6. A door detecting button 1f is mounted on a lower portion of the panel 1a for detecting the opening and closing of a door 2. When the door 2 is closed, the door, detecting button 1f is pushed in to operate an open/closed sensor positioned in the body 1 for applying a closed-door signal to the control unit 6. A hook-shaped engagement member 1g is attached to the lefthand side of the central portion of the panel 1a for engaging a locking member 2c on the door 2 when the door 2 is closed.

In the rear portion of the body 1, a power supply (not shown) for operating the FDD 7 and signal cords (not shown) for connection to an NC apparatus (described later) as provided.

The door 2 is openably and closably mounted by hinges 1b, on the front portion of the body 1 for protecting the panel 1a and preventing dust from entering through the FD insertion slot 1e. A handle 2a for opening and closing the door 2 is attached to a front face of the door 2. For opening the door 2, the handle 2a and a lever 2b disposed therein are gripped, whereupon the locking member inside the door 2 is unlocked from the engagement member 1g so that the door can be opened. The door 2 supports on its front face an access lamp 3 indicating that the FD 8 is being accessed and an alarm lamp 4 which flickers during an alarm state and an alarm buzzer 5 for generating noise during an alarm state, that is when the door 2 is opened while the FD 8 is being accessed. The access lamp 3, alarm lamp 4, and alarm buzzer 5 are operated under commands from the control unit 6 disposed in the body 1.

The portable FDD auxiliary memory device according to this embodiment is constructed as above. After the FD 8 has been loaded through the insertion slot 1e into the FDD 7, the door 2 is closed, and a closed-door signal is issued from the open/closed sensor. Upon receipt of the closed-door signal, the control unit 6 will permit access to the FD 8. Thereafter, an instruction to start to access the FD 8 is given manually or from an NC apparatus coupled to the portable FDD auxiliary memory device, whereupon the control unit 6 gives a command to start accessing the FD 8 to the FDD 7. In response to the access starting command, the FDD 7 starts to access the FD 8 and supplies the control unit 6 with a signal indicating that the FD 8 is being accessed. With this signal, the control unit 6 energizes the access lamp 3 on the door 2 to give the operator an indication that the FD 8 is being accessed.

If the door 2 is opened while the FDD 7 is accessing the FD 8 (and thus while the access lamp 3 is being energized), the door detecting button 1f on the panel 1a detects that, the door 2 is opened, enabling the open/closed sensor to send a signal to the control unit 6. The control unit 6 then flickers the alarm lamp 4 on the door 2 and actuates the alarm buzzer 5 in order to warn the operator of the open door. When the door 2 is closed by the operator upon noticing the alarm lamp 4 or the alarm buzzer 5, the door detecting button 1f is pushed in by the door 2, and a closed-door signal is sent from the open/closed sensor to the control unit 6. The control unit 6 now issues an OFF command to the alarm lamp 4 and the alarm buzzer 5.

Figure 4:
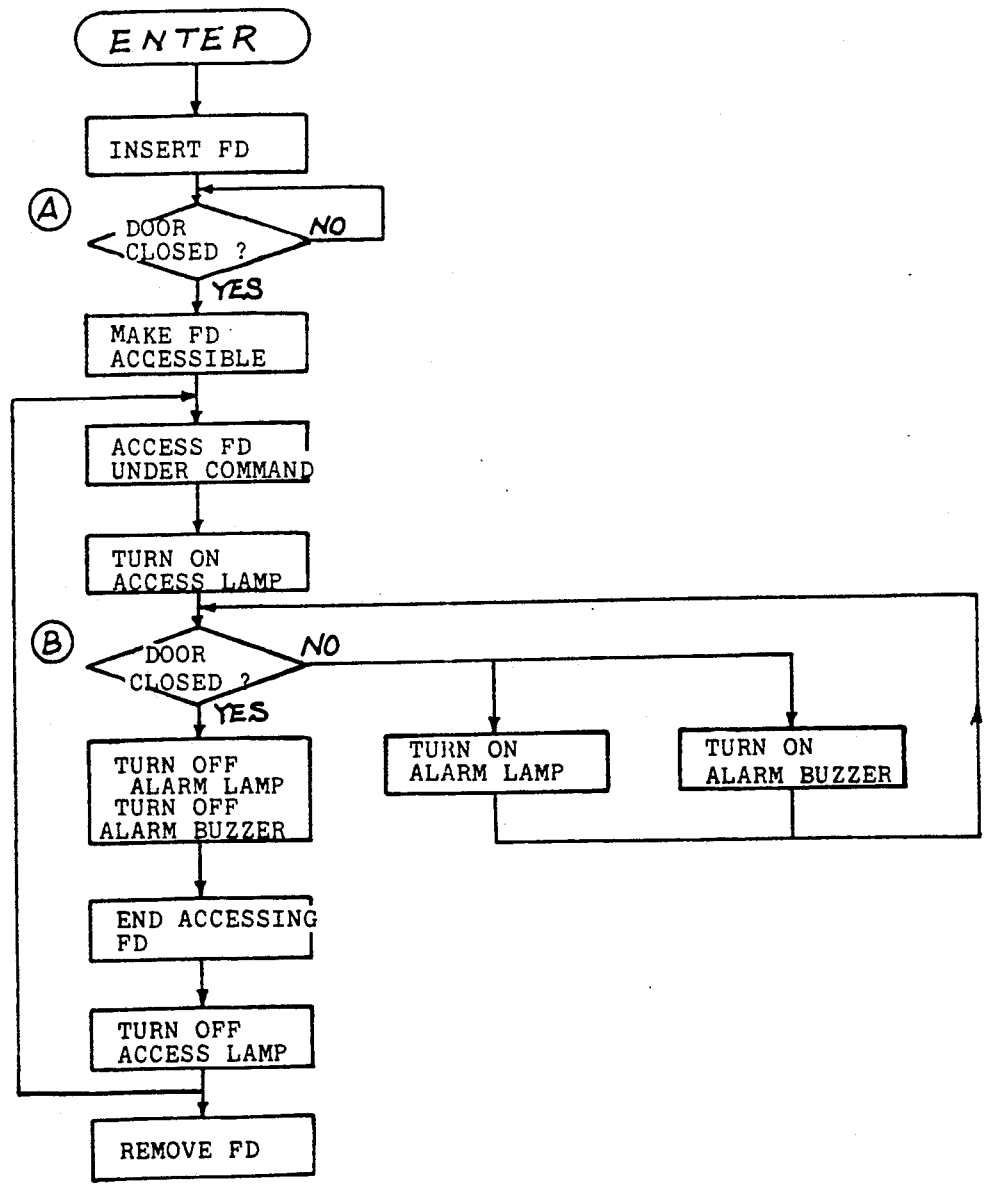
FIG. 4 is a flowchart of operation of the portable floppy disk auxiliary memory device.

FIG. 4 is a flowchart of operation of the embodiment of the present invention. The flowchart will now be described.

After the FD 8 has been inserted in the FDD 7, a step A ascertains whether the door 2 is closed or not. If the signal from the open/closed sensor indicates that the door is closed, then the FD 8 can be accessed by the FDD 7. When the FDD 7 starts accessing the FD 8 under a command from the control unit 6, the access lamp is turned on to indicate that the FD 8 is being accessed.

If the door 2 is opened while the FD 8 is being accessed, the answer to a decision step B is NO, and the alarm lamp 4 and the alarm buzzer 5 are turned on, warning the operator of the open door. If the door is then closed during step B, the alarm lamp 4 and the alarm buzzer 5 are turned off, and the warning is ended. The access lamp remain on until the accessing of the FD 8 is ended. After the accessing of the FD 8 is ended, the access lamp is turned off.

Figure 5:
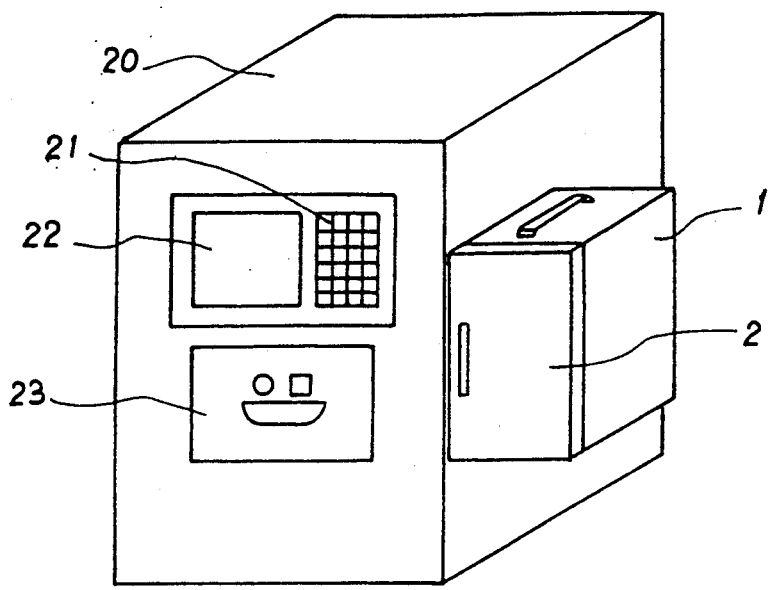
FIG. 5 is a perspective view of a numerical control apparatus to which the floppy disk auxiliary memory device of the has been attached.
Figure 6:
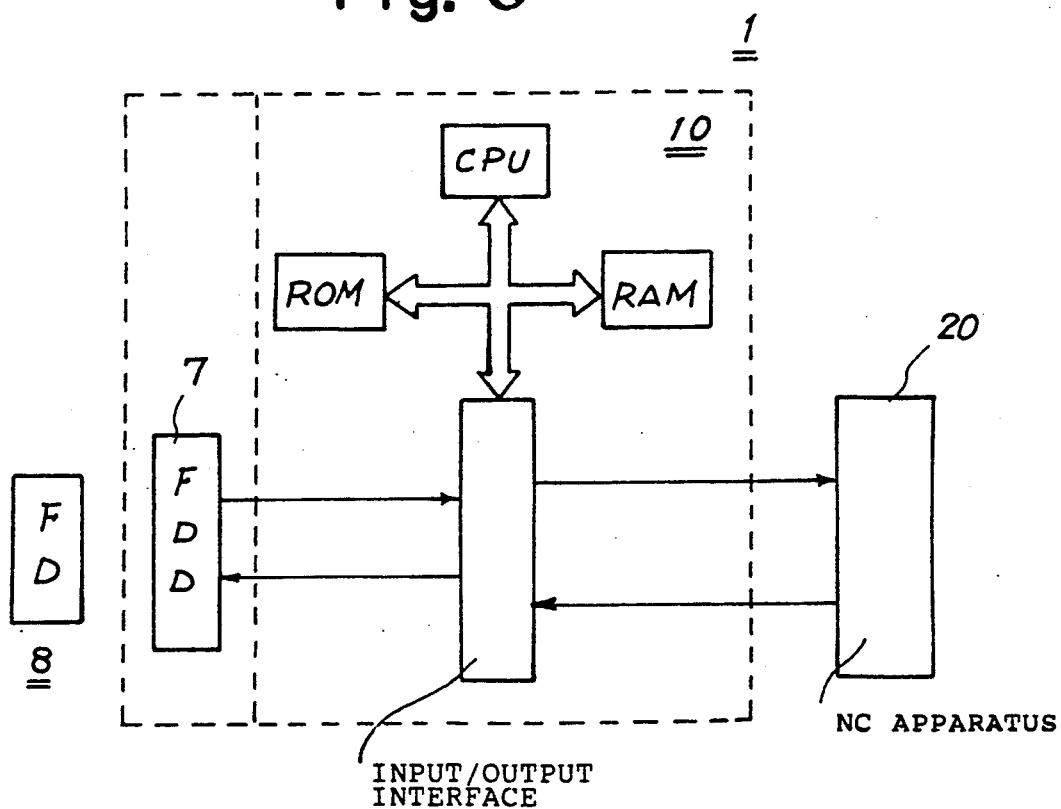
FIG. 6 is a block diagram of the floppy disk auxiliary memory device.

FIG. 5 is a view showing the portable FDD auxiliary memory device as attached to an NC apparatus, and FIG. 6 shows such an arrangement in block form.

Those parts in FIGS. 5 and 6 which are identical to those shown in FIGS. 1 through 3 are denoted by identical reference characters. Denoted at 20 is a machine control unit of an NC apparatus, 22 a display thereof, 21 a manual data input device thereof, and 23 a paper tape reader.

Designated at 10 is an arithmetic unit disposed in the portable, FD auxiliary memory device of the present invention and comprising a microcomputer composed of a CPU (central processing unit 11), a ROM (read-only memory 12), a RAM 13, an input/output interface 14, and a bus interconnecting these components. The RAM 13 serves to store the results of arithmetic operations effected, by the CPU 11 and data through, the input/output interface 14. The input/output interface 14 is connected to the FDD 7 and the NC apparatus 20 for data exchange between the FD 8, the NC apparatus 20, and the arithmetic unit 10.

With the body 1 connected to the NC apparatus 20, upon a command from the NC apparatus 2 data can be written into the memory of the FD 8 or data can be read from the FD 8. The auxiliary memory device thus serves as part of the memory of the NC apparatus 20.

Although a certain preferred embodiment has been shown and described, it should be understood that the present invention is not limited to the illustrated embodiment, but many changes and modifications may be made therein without departing from the scope of the present invention.

A portable floppy disk auxiliary memory device of the invention can be carried and has a dust-proof ability. Therefore, it can be used an a auxiliary memory device for a numerical control apparatus is for machine tools or the like which are employed in dusty places.

We claim:

1. A portable floppy disk auxiliary memory device for a machine control unit of a numeric control apparatus having a main memory for storing numeric control machining information, comprising:
   a body disposed outside the machine control unit and having an interior formed by sidewalls and containing a floppy disk drive device in the interior and having a floppy disk insertion slot defined in one of the sidewalls to receive a floppy disk having auxiliary numeric control machining information stored therein as a auxiliary memory;
   an input/output interface disposed in the body for data transfer from the auxiliary memory to the machine control unit;
   a door pivotally connected to a front portion of said body and being movable between open and closed positions over the sidewall of said body having the insertion slot;
   detecting means disposed in the vicinity of said door for detecting open and closed positions of said door,
   a control unit disposed is said body and coupled to the floppy disk drive and the detecting means for permitting access to the floppy disk when the door is detected in the closed position and for issuing an alarm signal and blocking access to the disk drive device when position of the door is open; and
   alarm means operable in response to the alarm signal from said control unit for indicating an alarm when the door is detected in the open position.

2. A portable floppy disk auxiliary memory device according to claim 1, wherein said alarm means is disposed on a front face of said door.

3. A portable floppy disk auxiliary memory device according to claim 1, wherein said body has a handle on an upper portion thereof.

4. A portable floppy disk auxiliary memory device according to claim 1, further comprising an input/output means for connecting said auxiliary memory device to a numerical control apparatus.

5. A portable floppy disk auxiliary memory device according to claim 1, wherein after insertion of a floppy disk into the floppy disk drive device said control unit will not permit access to the floppy disk until after said door is closed.

6. A portable floppy disk auxiliary memory device connectable to a numeric control apparatus to supplement existing memory, comprising:
   a floppy disk drive device;
   a body disposed outside the numeric control unit having n interior formed by sidewalls and containing said floppy disk drive device in the interior and having a floppy disk drive device in the interior and having a floppy disk insertion slot provided in one of the sidewalls of said body;
   covering means openably and closably operable for covering the floppy disk insertion slot;
   input/output means for connecting the auxiliary memory device to the numeric control apparatus;
   detecting means disposed in the vicinity of said covering means for detecting open and closed positions of said covering means;
   a control unit disposed in said body and coupled to the floppy disk drive and the detecting means for permitting access to the floppy disk when the door is detected in the closed position and for generating an alarm signal and for blocking access to the disk drive device when the detected position of the door is open; and
   alarm means operable in response to the alarm signal from said control unit for indicating an alarm when the door is detected in the open position.

7. A portable floppy disk auxiliary memory device according to claim 1, wherein said alarm means comprises a flashing light and a noise making device.

8. A portable floppy disk auxiliary memory device according to claim 6, wherein said alarm means comprises a flashing light and a noise making device.

* * * * *

UNITED STATES PATENT AND TRADEMARK OFFICE
CERTIFICATE OF CORRECTION

PATENT NO. : 5,088,084
DATED : February 11, 1992
INVENTOR(S) : Hidetsugu Komiya, et al.

It is certified that error appears in the above-identified patent and that said Letters Patent is hereby corrected as shown below:

Col. 1, line 33, "machines" should be --machine--;

line 36, "apparatus" should be --apparatuses--; and after "However" insert --,--.

Col. 2, line 32, delete "of the"; and line 68, "as" should be --are--.

Col. 3, line 12, after "alarm" insert --signal--; and line 49, "operation of the" should be --operations of this--.

Col. 4, line 23, "2" should be --20--; and line 36, "apparatus" should be --apparatuses--.

Signed and Sealed this

Twenty-fourth Day of August, 1993

*Attest:*

BRUCE LEHMAN

*Attesting Officer*     *Commissioner of Patents and Trademarks*